Patented Feb. 1, 1949

2,460,777

UNITED STATES PATENT OFFICE 2,460,777

WATERPROOFING CELLULOSIC MATERIAL WITH HIGHER ALIPHATIC ACYL PEROXIDES

Warren B. Warden, Bradford, Pa., assignor to Peter J. Gaylor, Newark, N. J.

No Drawing. Application February 18, 1946, Serial No. 648,573

6 Claims. (Cl. 8—120)

This invention deals with the waterproofing of reactive solid materials, such as textiles, films, yarns, and the like, having groups (such as OH, NH$_2$ etc.) which are capable of reacting with acidic reagents. More specifically, it relates to the treatment of such materials with organic peroxides having a long chain in their molecular structure.

There are a number of methods now employed for waterproofing fabrics. For example, raincoats are usually waterproofed by impregnating the cloth with a solution of an oil-soluble soap, such as aluminum stearate. These materials are quite effective for the purpose, but they have poor permanency, and are easily removed in dry cleaning or laundering operations.

A more permanent waterproofing agent is the class of organic silicones. These also possess disadvantages, such as high cost, special treating methods for the fabric, etc.

An object of the present invention is to provide a relatively simple method for permanently waterproofing fabrics and other materials. Another object is to provide for waterproofing within the fiber or structure of the material itself, thereby giving a greater permanence and effectiveness than hitherto obtained by surface treatment or impregnation. The invention involves the treatment of the material to be waterproofed with an organic peroxide having alkyl groups containing 10 to 20 carbon atoms in its molecule, and preferably 10 to 18 carbon atoms, and heating to the decomposition temperature of the peroxide whereupon a reaction takes place between the material and the peroxide. In the course of this reaction, it is believed that the long alkyl group attaches directly to the molecule of the material treated, which may be cotton, rayon, cellulose, paper, Cellophane, wool, silk, nylon, leather, wood, or other solid material having groups in its molecules reactive with acidic reagents. The material may be in the form of yarn, cloth, film, or molded or manufactured articles with surfaces to be waterproofed.

The preferred method of treatment is to dissolve the peroxide in a solvent non-reactive therewith and to then impregnate the surface or material with the solution. Thereafter, the solvent is removed by evaporation or otherwise, and the material is heated to, and preferably somewhat above the decomposition temperature of the peroxide. Since time and temperature are somewhat interchangeable, it is possible to employ a long time just at the decomposition temperature of the peroxide, or a short time at a relatively high temperature, quite beyond the decomposition point of the peroxide. For example, stearyl peroxide gives good waterproofing of the permanent type when a textile containing it is heated to 225° F. for about 10 minutes. On the other hand, when a flatiron heated to about 400° F. is used on the cloth, only a few slow passes over the treated cloth are sufficient to give the desired waterproofing properties.

The decomposition temperatures of the peroxides generally increase with increase in molecular weight. For example, lauroyl peroxide $(C_{11}H_{23}CO)_2O_2$, decomposes at about 130–133° F. at atmospheric pressure, whereas stearyl peroxide, $(C_{17}H_{35}CO)_2O_2$, decomposes at 172–176° F. These peroxides may be prepared by reacting fatty acid chlorides with hydrogen peroxide or with alkali metal peroxides, as disclosed in U. S. Patents 1,718,609 and 2,301,124. Among the fatty acids which may be so treated are those of coconut or cocoa butter, stearic, lauric, palmitic, lard, phenyl stearic, myristic, mixed acids, and the like. It is preferred to employ saturated chlorides, although unsaturated compounds are not excluded.

One of the advantageous features of the present invention is the safety of the operations involved. The peroxides employed are stable compounds and do not explode on heating as do other peroxides. When incorporated in nonflammable solvents, these peroxides may be used by a housewife to impregnate clothing, draperies, slip covers for chairs, and the like, after which she may run a hot iron over the cloth (preferably after most of the solvent has evaporated), and thereby effect permanent waterproofing of any articles she desires to treat.

The invention may be more clearly understood from the following examples which illustrate some of the many phases involved:

Example 1

Stearyl peroxide was dissolved in trichloroethylene to the extent of 5–10% by weight. A cotton cloth was dipped in the solution until it was soaked through, and then allowed to stand in the air until the solvent had evaporated. The cloth was then placed in an oven at 250° F. for about 15 minutes.

The surface of the cloth thus obtained had a "good" feel and was exceptionally water repellent even after repeated washings with soap and water, and after repeated drycleaning with carbon tetrachloride or "trichlor," or after soaking overnight in these drycleaning solvents.

Example 2

A cotton cloth was treated in the same manner as in Example 1, except that the final oven-heating operation was omitted. The cloth had a greasy feel and the water repellency could be removed by washing with soap and water or by dry cleaning.

This experiment shows the necessity of the final heating or "fixing" step.

I claim:

1. A method for waterproofing solid cellulosic materials, comprising treating said materials with an organic peroxide having an aliphatic acyl group containing 10 to 20 carbon atoms dissolved in an inert solvent, substantially removing the solvent, and heating the thus treated material at least to the decomposition temperature of the peroxide.

2. A method for waterproofing cellulosic textiles, according to claim 1 in which the thus treated textiles are heated at least to the decomposition temperature of the peroxide.

3. A method for waterproofing cellulosic textiles according to claim 2 in which the textiles are cotton textiles.

4. A method for waterproofing cellulosic textiles according to claim 3 in which the thus treated textiles are heated to about 225° F. for about 10 minutes.

5. A method according to claim 4 in which the peroxide is stearyl peroxide.

6. A method according to claim 1 in which the inert solvent is trichloroethylene.

WARREN B. WARDEN.

REFERENCES CITED

The following references are of record in the file of this patent:

UNITED STATES PATENTS

| Number | Name | Date |
|---|---|---|
| 1,718,609 | Stoddard et al. | June 25, 1929 |
| 2,130,150 | Nathansohn | Sept. 13, 1938 |
| 2,267,276 | Hager | Dec. 23, 1941 |

OTHER REFERENCES

Clover et al., 29 Am. Ch. J. 179–203 (March 1903).

Matthews, Bleaching and Related Processes, 1921, Chem. Catalog Co., N. Y., page 372.